United States Patent [19]

Miyata

[11] Patent Number: 4,686,791
[45] Date of Patent: Aug. 18, 1987

[54] AGRICULTURAL FILM STRUCTURE

[75] Inventor: Shigeo Miyata, Takamatsu, Japan

[73] Assignee: Kyowa Chemical Industry Co., Ltd., Tokyo, Japan

[21] Appl. No.: 935,085

[22] Filed: Nov. 24, 1986

Related U.S. Application Data

[60] Continuation of Ser. No. 755,588, Aug. 21, 1985, which is a division of Ser. No. 670,599, Nov. 13, 1984.

[30] Foreign Application Priority Data

Nov. 12, 1983 [JP] Japan ............... 58-211697

[51] Int. Cl.$^4$ ............ A01G 13/04; C08K 3/10
[52] U.S. Cl. ............................. 47/29; 524/437
[58] Field of Search ............ 47/29, 26, 28 R, 2; 524/437

[56] References Cited

U.S. PATENT DOCUMENTS

| | | | |
|---|---|---|---|
| 4,075,784 | 2/1978 | Pied | 47/29 X |
| 4,154,718 | 5/1979 | Miyata et al. | 524/427 X |
| 4,170,087 | 10/1979 | Tapia | 47/29 |
| 4,299,759 | 11/1981 | Miyata et al. | 524/427 X |
| 4,481,254 | 11/1984 | Fukushima et al. | 428/516 X |
| 4,542,061 | 9/1985 | Fukushima et al. | 47/29 X |

FOREIGN PATENT DOCUMENTS

| | | | |
|---|---|---|---|
| 157634 | 12/1980 | Japan | 47/29 |
| 157443 | 12/1981 | Japan | 47/29 |
| 174326 | 10/1982 | Japan | 47/29 |
| 2052522 | 1/1981 | United Kingdom | 47/29 |

Primary Examiner—Robert E. Bagwill
Attorney, Agent, or Firm—Sherman and Shalloway

[57] ABSTRACT

An agricultural film structure composed of a mixture of a thermoplastic resin and an infrared radiation-absorbing powdery inorganic compound, said mixture comprising
(a) 100 parts by weight of a thermoplastic resin and
(b) about 1 to about 20 parts by weight of a hydrotalcite powder, as the infrared radiation absorbing powdery inorganic compound, having an average secondary particle diameter of not more than about 5 microns and a BET specific surface area of not more than about 30 m$^2$/g and being represented by the following formula (1)

$$M_{1-x}^{2+} Al_x(OH)_2(A^{n-})_{x/n} mH_2O \quad (1)$$

wherein M$^{2+}$ represents a divalent metal ion selected from the group consisting of Mg, Ca and Zn ions, A$^{n-}$ represents an anion having a valence of n, and x and m satisfy the following conditions $0 < x < 0.5$
$0 \leq m \leq 2$.

4 Claims, No Drawings

AGRICULTURAL FILM STRUCTURE

This application is a continuation of application Ser. No. 755,588, filed Aug. 21, 1985, which was a division of application Ser. No. 670,599, filed Nov. 13, 1984.

This invention relates to an agricultural film structure for use in agriculture in a broad sense including agriculture, horticulture, forestry, etc. Particularly, it relates to an excellent agricultural film structure which shows excellent transmission to visible light and an excellent ability to absorb infrared radiation in a wide infrared region ranging from about 5 microns to about 50 microns and as a result can maintain high heat insulating property by preventing infrared radiation (heat waves) from dissipating out of a place for growing plants which is covered with the film structure.

More specifically, it relates to an agricultural film structure composed of a mixture of a thermoplastic resin and an infrared radiation-absorbing powdery inorganic compound, said mixture comprising (a) 100 parts by weight of a thermoplastic resin and
(b) about 1 to about 20 parts by weight of a hydrotalcite powder, as the infrared radiation absorbing powdery inorganic compound, having an average secondary particle diameter of not more than about 5 microns and a BET specific surface area of not more than about 30 m$^2$/g and being represented by the following formula (1)

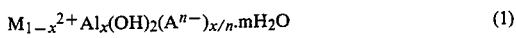

$$M_{1-x}^{2+}Al_x(OH)_2(A^{n-})_{x/n}\cdot mH_2O \qquad (1)$$

wherein $M^{2+}$ represents a divalent metal ion selected from the group consisting of Mg, Ca and Zn ions, $A^{n-}$ represents an anion having a valence of n, and x and m satisfy the following conditions
$0 < x < 0.5$
$0 \leq m \leq 2$.

Heretofore, agricultural film structures composed of a mixture of a thermoplastic resin and an infrared radiation absorbing powdery compound (inorganic infrared radiation absorbing agent) have been utilized in agriculture in a broad sense including agriculture, horticulture and forestry, for example in greenhouse cultivation, house cultivation, tunnel cultivation and mulch cultivation.

Such an agricultural film structure is required to have light perviousness and heat insulating property. The temperature within houses or tunnels which has risen by sunlight irradiation during the daytime decreases at night because infrared radiation (heat waves) radiated from the ground or plants dissipate through the film structure. It is desired therefore to prevent such undesirable cooling. This can be accomplished by minimizing the transmission and dissipation of infrared radiation from houses or tunnels through the agricultural film structures. For this purpose, it has been proposed to include into the film structures an infrared radiation absorbing agent having the ability to absorb light in the infrared region and inhibit its dissipation.

For example, Japanese Laid-Open Patent Publication No. 60347/1979 discloses an agricultural film structure formed from a composition comprising 100 parts by weight of an olefinic resin and 1 to 15 parts by weight of dry silica gel.

Japanese Laid-Open Patent Publication No. 164238/1980 discloses an agricultural vinyl chloride resin film structure having improved heat insulating property formed by kneading a transparent vinyl chloride resin with 1 to 25% by weight (based on the mixture) of an inorganic fine powder capable of absorbing infrared radiation with a wavelength of 18 to 50 microns, preferably a powder of at least one of a hydroxide, halide, borate, aluminate and sulfate of lithium, calcium and magnesium, and molding the mixture into a film having a thickness of 20 to 200 microns.

Japanese Patent Publication No. 43354/1981 discloses an agricultural film structure having a thickness of 20 to 200 microns obtained by molding a thermoplastic resin containing as fillers a metallic powder, preferably an aluminum powder, and an inorganic powder capable of absorbing infrared radiation having a wavelength of 5 to 50 microns, particularly at least one of silicon oxide, aluminum oxide, magnesium oxide, aluminum hydroxide, silicate salts and phosphate salts, the amount of the fillers being such that the resulting film has a transmittance to visible light of at least 40%.

The agricultural film structures containing inorganic infrared radiation absorbing agents which have been proposed heretofore including those exemplified above have not proved to be entirely satisfactory because they have the defect that the region of infrared radiation which they absorb is too narrow, they have poor dispersibility in or affinity for resins, and they have substantialy reduced perviousness to visible light.

The present inventor has made investigations in order to develop an agricultural film structure which can overcome the aforesaid defects and has excellent light perviousness and heat insulating property.

These investigations have led to the discovery that a thermoplastic resin film structure containing a specific amount of the hydrotalcite represented by the above formula (1) and having an average secondary particle diameter of not more than about 5 microns and a BET specific surface area of not more than about 30 m$^2$/g, which has not been proposed previously, has excellent perviousness to visible light and an excellent ability to absorb infrared radiation in a broad infrared region having a wavelength of about 5 microns to about 50 microns and can prevent its transmission and dissipation, and also has high heat insulating property, and shows excellent properties as an agricultural film structure. It has also been found that a composition comprising a thermoplastic resin and the aforesaid hydrotalcite has good film moldability.

Magnesium hydroxide and silicon dioxide which have relatively high infrared absorbing ability among the previously proposed inorganic infrared absorbing agents for agricultural film structures have a refractive index of about 1.56 and about 1.5–1.6, respectively. In contrast, the hydrotalcite of formula (1) utilized in the present invention has a refractive index of about 1.48 to about 1.5 which well agrees with the refractive indices of thermoplastic resins frequently used in agricultural films, for example low-density polyethylene having a refractive index of about 1.49 and polyvinyl chloride having a refractive index of about 1.5. The present inventor presumes that this agreement of refractive indices, coupled with the requirements for the average secondary diameter and the BET specific surface area of the hydrotalcite, is one factor that is conducive to the excellent perviousness to visible light of the film of the invention without impairing its transparency.

Investigations of the present inventor have shown that the hydrotalcite of formula (1) has an excellent ability to absorb infrared radiation also in an infrared region of about 5 to 18 microns while magnesium hydroxide, one of the best infrared radiation absorbing agents previously proposed for agricultural film structures, shows an infrared absorption region of 18 to 50 microns, and therefore, the agricultural film structure of the present invention exhibits an excellent ability to absorb infrared radiation over the entire range of about 5 to about 50 microns and inhibits its transmission and dissipation, whereby it shows excellent heat insulating property. The inventor presumes that the inclusion of the Al—O—H bond and the anion $A^{n-}$ in the crystal structure of the hydrotalcite of formula (1) in addition to $M^{2+}$ has some bearing on this excellent infrared radiation absorption.

It has further been found that presumably because of the inclusion of $M^{2+}$, Al, OH and $A^{n-}$ in one crystal structure of the hydrotalcite of formula (1), the hydrotalcite in accordance with this invention can exhibit excellent properties that cannot be achieved by a mixture of inorganic compounds containing them individually, and that by selecting and changing $M^{2+}$ and/or $A^{n-}$ as desired, the infrared radiation region can be adjusted.

It is an object of this invention to provide an agricultural film structure having various excellent properties.

The above and other objects and advantages of this invention will become more apparent from the following description.

The inorganic infrared radiation absorbing agent used in the agricultural film structure of this invention is a hydrotalcite represented by the following formula (1)

$$M_{1-x}^{2+}Al_x(OH)_2(A^{n-})_{x/n}\cdot mH_2O \qquad (1)$$

wherein $M^{2+}$ represents a divalent metal ion selected from the group consisting of Mg, Ca and Zn ions, $A^{n-}$ represents an anion having a valence of n, and x and m satisfy the following conditions $0 < x < 0.5$
$0 \leq m \leq 2$.

Examples of the anion having a valence of n represented by $A^{n-}$ are $Cl^-$, $Br^-$, $I^-$, $NO_3^-$, $ClO_4^-$, $SO_4^{2-}$, $CO_3^{2-}$, $SiO_3^{2-}$, $HPO_4^{2-}$, $HBO_3^{2-}$, $PO_4^{3-}$, $Fe(CN)_6^{3-}$,

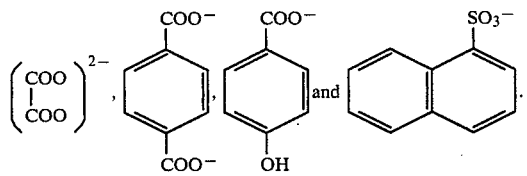

The hydrotalcite in accordance with this invention has an average secondary particle diameter of not more than about 5 microns, for example about 0.1 to about 5 microns, preferably not more than about 4 microns, more preferably not more than about 3 microns, especially not more than about 2 microns, and a BET specific surface area of not more than about 30 m²/g, for example about 1 to about 30 m²/g, preferably not more than about 25 m²/g. The use of the hydrotalcite having an average secondary particle diameter and a BET specific surface area outside the above-specified ranges substantially reduces the transmittance of visible light and tends to affect adversely the moldability of a thermoplastic resin composition containing the hydrotalcite of formula (1) and the properties of the resulting film. Hence, the hydrotalcite of formula (1) which meets the above requirements for the secondary particle diameter and the BET specific surface area should be used.

The average secondary particle diameter is determined by the following method.

About 2-3 mg of a sample is placed on a glass plate, and a suitable amount of a dispersing agent (DISLIGHT, a trade name) is added to the sample, and the two are sufficiently kneaded by a spatula. The mixture is then diluted with a small amount of cyclohexanol. One drop of the dilution is placed on a slide glass and covered with a cover glass. The sample is mounted on a microscope, and its image is converted to a television image. The largest diameters of the respective particles appearing on the television image and the number of such particles are automatically measured. The operation is repeated by selecting 20 different visual fields. From the data obtained, the arithmetic average of the particle diameters of the secondary particles is calculated.

The hydrotalcite of formula (1) can be used after treating it with a surface-treating agent. The surface treatment is preferred because it further increases the dispersibility and affinity in and for thermoplastic resins and favorably improves the film formability of the thermoplastic resins and the properties of the resulting film. Furthermore, it improves the ability of the film to permit transmission of visible light.

The surface-treating agent may, for example, include higher fatty acids, for example fatty acids having 10 to 18 carbon atoms, alkali metal salts of higher fatty acids such as potassium and sodium salts of fatty acids having 10 to 18 carbon atoms, and coupling agents such as titanates and silanes. Specific examples are alkali metal salts of higher fatty acids such as sodium laurate, potassium laurate, sodium oleate, potassium oleate, sodium stearate, potassium stearate, sodium palmitate, potassium palmitate, sodium caprate, potassium caprate, sodium myristate, potassium myristate, sodium linoleate and potassium linoleate; higher fatty acids such as lauric acid, palmitic acid, oleic acid, stearic acid, capric acid, myristic acid and linoleic acid; and coupling agents such as isopropyltriisostearoyl titanate, isopropyltris(dioctylpyrophosphate)titanate, tetraisopropylbis (dioctyl phosphite)titanate, vinyltriethoxysilane, gamma-methacryloypropyltrimethoxysilane and gamma-glycidoxypropyltrimethoxysilane.

The surface treatment can be performed, for example, by adding an aqueous solution of an alkali metal salt of a higher fatty acid with stirring to a suspension of the hydrotalcite of formula (1) in warm water, or adding dropwise a molten liquid of a higher fatty acid or a dilution of the coupling agent to the hydrotalcite powder being agitated by a mixer such as a Henschel mixer. The amount of the surface treating agent to be applied by surface treatment can be selected as desired, and is, for example, about 1 to about 10% by weight based on the hydrotalcite of formula (1).

The thermoplastic resin as a base resin of the agricultural film structure of this invention can be properly selected. Examples include olefinic resins, for example polymers or copolymers of olefins such as ethylene, propylene, butene-1 and 4-methylpentene-1, copolymers of these olefins with other copolymerizable monomers (such as ethylene/vinyl acetate copolymer); vinyl chloride resins, for example vinyl chloride polymer, and copolymers of vinyl chloride with acrylic or methacrylic acid-type monomers; blends of the above-exemplified resins; and blends of the above-exemplified resins as a major component and other resins. Examples of the other resins are polycarbonate resins, ionomer resins and polyethylene terephthalate resin.

The base resin preferably permits good transmission of visible light to infrared rays of up to about 5 microns in wavelength when molded into a film structure.

The amount of the hydrotalcite used in the agricultural film structure of this invention is about 1 to about 20 parts by weight per 100 parts by weight of the thermoplastic resin. If it is too small beyond the lower limit, the desired infrared radiation absorbing ability of the film is reduced and its ability to inhibit transmission and dissipation of infrared radiation through the film becomes insufficient. Hence, the desired heat insulating property is difficult to impart. On the other hand, if it is too large above the upper limit, the transparency of the film is greatly reduced, and the ability of the film to permit transmission of visible light is substantially reduced. Furthermore, adverse effects are exerted on the properties, such as mechanical strength, of the film.

The agricultural film structure of this invention can be produced by any known film forming means such as melt extrusion, inflation molding, and calender molding except that the hydrotalcite of formula (1) having the specified average secondary particle diameter and BET specific surface area is incorporated in the aforesaid amount in the above-exemplified thermoplastic resin. The thickness of the film can be properly selected. Usually, thickness of about 10 to about 200 microns are most commonly used.

The agricultural film structure of this invention may include various other additives customarily used in the art. They include, for example, stabilizers, antihaze agents, ultraviolet absorbers, surface-active agents, antistatic agents, water droplet formation inhibitors, plasticizers and lubricants. The amounts of such additives are, for example, about 0.01 to about 10% by weight for the stabilizers, antihaze agents, ultraviolet absorbers, surface active agents, antistatic agents and plasticizers, and about 1 to about 80% by weight for the water droplet formation inhibitors, all based on the weight of the thermoplastic resin. These additives are well known to those skilled in the art.

Specific examples of the stabilizers are substituted phenols and bisphenols, amines, sulfur-containing compounds, phosphite salts, epoxy compounds, phosphate salts, polyhydric alcohols, and organic metal salts containing sodium, calcium, barium, strontium, zinc, antimony, tin, lead, magnesium and titanium.

Specific examples of the antihaze agents are nonionic surface-active agents such as sorbitan fatty acid monoesters and pentaerythritol fatty acid esters.

Specific examples of the ultraviolet absorbers are benzophenone compounds such as 2-hydroxybenzophenone, 2,4-dihydroxybenzophenone, 2,2,4-trihydroxybenzophenone and 2,2',4,4'-tetrahydroxybenzophenone, salicylate compounds such as phenyl salicylate, 2,4-di-tert.butylpheny 3,5-di-tert butyl-4-hydroxybenzoate, benzotriazole compounds such as 2'-hydroxyphenyhlbenzotriazole, 2'-hydroxy-3'-tert.butylbenzotriazole and 5'-methylphenylbenzotriazole, acrylic compounds such as ethyl-2-cyano-3,3-diphenyl acrylate and methyl-2-carbomethoxy-3-(p-methoxy) acrylate, metal complex salts such as nickel [2,2-thiobis(4-tertiary octyl) phenylate]n-butylamine and nickel butyldithiocarbamate, and hindered amines such as bis-(2,2,6,6-tetramethylpiperidinyl) sebacate.

Specific examples of the surface-active agents and antistatic agents are cationic surface-active agents such as primary amine salts, secondary amines, quaternary ammonium compounds and pyridine derivatives, anionic surface-active agents such as sulfurized oil, soaps, sulfurized ester oils, sulfurized amide oils and olefin sulfuric acid ester salts, nonionic surface-active agents such as partial fatty acid esters of polyhydric alcohols and ethylene oxide adducts of aliphatic alcohols, and amphoteric surface-active agents such as carboxylic acid derivatives and imidazoline derivatives.

Specific examples of the water droplet formation preventing agent are silica gel and nonionic surface-active agents such as partial esters formed between fatty acids and polyhydric alcohols.

Specific examples of the plasticizers are phthalates such as DOP and DBP, phosphates such as TCP and TOP, adipates such as DOA and DIDA, sebacates such as DBS and DOS, azelates such as DOZ and DHZ, citrates such as triethyl citrate and triethyl acetylcitrate, glycollates such as MPEG and EPEG, trimellitates such as TBTM and VHTM, esters of phthalic acid isomers such as DOIP and DOTP, ricinoleates such as MAR and BAR, polyesters, epoxy compounds such as ESPO and epoxidized linseed oil.

Specific examples of the lubricants are hydrocarbons such as liquid paraffin and chlorinated hydrocarbons, fatty acid type compounds such as higher fatty acids, hydroxyfatty acids, fatty acid amides and alkylenebis fatty acids, esters such as lower alcohol esters of fatty acids, polyhydric alcohol esters of fatty acids, polyglycol esters of fatty acids and aliphatic alcohol esters of fatty acids, alcohols such as polyhydric alcohol, polyglycols and polyglycerol, and metal soaps.

According to this invention, there is provided a process for producing an agricultural film structure, which comprises mixing 100 parts of a thermoplastic resin, about 1 to about 20 parts by weight of the hydrotalcite powder represented by formula (1) given hereinabove and having an average secondary particle diameter of not more than 5 microns and a BET specific area of not more than about 30 m$^2$/g, and other additives exemplified above, and molding the resulting resin composition into a film form.

According to this invention, there is also provided a method of growing cultivated plants, which comprises covering the locus in which the cultivated plants are growing or are to be grown, with an agricultural film structure composed of a mixture of a thermoplastic resin and an infrared radiation-absorbing powdery inorganic compound, said mixture comprising (a) 100 parts by weight of a thermoplastic resin and
(b) about 1 to about 20 parts by weight of a hydrotalcite powder, as the infrared radiation absorbing powdery inorganic compound, having an average secondary particle diameter of not more than about 5 microns and a BET specific surface area of not more than about 30 m$^2$/g and being represented by the following formula (1)

$$M_{1-x}^{2+}Al_x(OH)_2(A^{n-})_{x/n}\cdot mH_2O \tag{1}$$

wherein $M^{2+}$ represents a divalent metal ion selected from the group consisting of Mg, Ca and Zn ions, $A^{n-}$ represents an anion having a valence of n, and x and m satisfy the following conditions
$0 < x < 0.5$
$0 \leq m \leq 2$.

The following examples illustrate the present invention more specifically.

EXAMPLE 1

One kilogram of hydrotalcite having the chemical composition $Mg_{0.66}Al_{0.34}(OH)_2(SiO_3^{2-})_{0.17}.0.52H_2O$, an average secondary particle of 0.4 micron, and a BET specific surface area of 15 m$^2$/g was suspended in about 10 liters of water.

The suspension was heated to about 80° C., and 1 liter of hot water (at about 80° C.) having 30 g of sodium stearate dissolved therein was added to the suspension with stirring. The mixture was stirred for about 30 minutes, filtered, dried and pulverized.

Five parts by weight of the resulting surface-treated hydrotalcite was uniformly mixed with 100 parts of low-density polyethylene. The mixture was formed into a film having a thickness of 50 microns by an inflation molding method.

The visible light (0.4–0.7 microns) transmittance, infrared radiation (5–50 microns) transmittance and heat insulating effect of the resulting agricultural film were measured. The results are shown in Table 1.

The heat insulating effect was measured by building an agricultural film by stretching the sample film, and the temperature of the inside and the temperature of the atmosphere exteriorly of the tunnel were measured. The lowest temperature of the inside of the tunnel was determined, and used as a measure of the heat insulating effect.

COMPARATIVE EXAMPLE 1

A comparative film was prepared in the same way as in Example 1 except that hydrotalcite having the chemical composition $Mg_{0.66}Al_{0.34}(OH)_2(SiO_3^{2-})_{0.17}.0.47H_2O$, an average secondary particle diameter of 24 microns and a BET specific surface area of 102 m$^2$/g. The visible light and infrared radiation transmittances and heat insulating effect of the resulting film were measured as in Example 1. The results are summarized in Table 1.

COMPARATIVE EXAMPLE 2

A comparative film was prepared in the same way as in Example 1 except that hydrotalcite having the chemical composition $Mg_{0.66}Al_{0.34}(OH)_2(SiO_2^{2-})_{0.17}.0.52H_2O$, an average secondary particle diameter of 12 microns and a BET specific surface area of 12 m$^2$/g. The visible light and infrared radiation transmittances and heat insulating effect of the resulting film were measured in Example 1. The results are summarized in Table 1.

COMPARATIVE EXAMPLE 3

A comparative film was prepared in the same way as in Example 1 except that silicon oxide powder having an average secondary particle diameter of 6 microns and a BET specific surface area of 68 m$^2$/g was used instead of the hydrotalcite.

The visible light and infrared radiation transmittances and heat insulating effect of the resulting film were measured as in Example 1. The results are summarized in Table 1.

CONTROL EXAMPLE 1

A control film was prepared in the same way as in Example 1 except that the addition of the hydrotalcite was omitted. The visible light and infrared radiation transmittances and heat insulating effect of the resulting film were measured as in Example 1. The results are summarized in Table 1.

EXAMPLE 2

One kilogram of hydrotalcite having the chemical composition $Mg_{0.70}Al_{0.30}(OH)_2(HPO_4^{2-})_{0.15}0.40H_2O$, an average secondary particle diameter of 1.1 micron, and a BET specific surface area of 19 m$^2$/g was suspended in about 10 liters of water.

The suspension was heated to about 60° C., and 1 liter of hot water (at about 60° C.) having 20 g of sodium oleate dissolved therein was added to the suspension with stirring. The mixture was stirred for about 30 minutes, filtered, dried and pulverized.

Five parts by weight of the resulting surface-treated hydrotalcite was uniformly mixed with 100 parts of low-density polyethylene. The mixture was formed into a film having a thickness of 50 microns by an inflation molding method.

The visible light and infrared radiation transmittances and heat insulating effect of the resulting film were measured as in Example 1. The results are summarized in Table 1.

EXAMPLE 3

An agricultural film was prepared in the same way as in Example 1 except that hydrotalcite having the chemical composition $Mg_{0.8}Al_{0.2}(OH)_2(SO_4^{2-})_{0.1}.0.6H_2O$, an average secondary particle diameter of 1.8 microns and a BET specific surface area of 9 m$^2$/g was used. The same properties of the film as in Example 2 were measured, and the results are shown in Table 1.

EXAMPLE 4

An agricultural film was prepared in the same way as in Example 1 except that hydrotalcite having the chemical composition $Zn_{0.7}Al_{0.3}(OH)_2[(C_6H_4(OH)COO^-)]_{0.3}.0.58H_2O$, an average secondary particle diameter of 0.2 micron and a BET specific surface area of 22 m$^2$/g was used. The same properties of the film as in Example 2 were measured, and the results are shown in Table 1.

TABLE 1

| Example | Inorganic infrared radiation absorbing agent | | | Amount per 100 parts by weight of resin | Visible light (0.4–0.7 micron) transmittance (%) | Infrared (5–50 micron) transmittance (%) | Heat insulating effect (the lowest temperature, °C., inside the tunnel under the lowest outside temperature was −2.1° C. |
|---|---|---|---|---|---|---|---|
| | Type | Average secondary particle diameter (microns) | BET specific surface area (m$^2$/g) | | | | |
| Example 1 | $Mg_{0.66}Al_{0.34}(OH)_2(SiO_3^{2-})_{0.17}.0.52H_2O$ | 0.4 | 15 | 5 | 86 | 8 | 5.4 |
| Comparative Example 1 | $Mg_{0.66}Al_{0.34}(OH)_2(SiO_3^{2-})_{0.17}.0.47H_2O$ | 24 | 102 | 5 | 59 | 10 | 4.4 |
| Comparative | $Mg_{0.66}Al_{0.34}(OH)_2(SiO_3^{2-})_{0.17}.0.52H_2O$ | 12 | 12 | 5 | 68 | 9 | 4.5 |

TABLE 1-continued

| Example | Inorganic infrared radiation absorbing agent Type | Average secondary particle diameter (microns) | BET specific surface area (m²/g) | Amount per 100 parts by weight of resin | Visible light (0.4–0.7 micron) transmittance (%) | Infrared (5–50 micron) transmittance (%) | Heat insulating effect (the lowest temperature, °C., inside the tunnel under the lowest outside temperature was −2.1° C. |
|---|---|---|---|---|---|---|---|
| Example 2 Comparative | Silicon oxide | 6 | 68 | 5 | 63 | 35 | 3.8 |
| Example 3 Control | — | — | — | — | 90 | 81 | 2.4 |
| Example 1 | | | | | | | |
| Example 2 | $Mg_{0.70}Al_{0.30}(OH)_2(HPO_4{}^{2-})_{0.15} \cdot 0.40H_2O$ | 1.1 | 19 | 5 | 84 | 10 | 4.8 |
| Example 3 | $Mg_{0.8}Al_{0.2}(OH)_2(SO_4{}^{2-})_{0.1} \cdot 0.6H_2O$ | 1.8 | 9 | 5 | 83 | 13 | 4.6 |
| Example 4 | $Zn_{0.7}Al_{0.3}(OH)_2[C_6H_4(OH)COO^-]_{0.3} \cdot 0.58H_2O$ | 0.2 | 22 | 5 | 88 | 9 | 5.1 |

EXAMPLE 5

One kilogram of hydrotalcite having the chemical composition $Mg_{0.7}Al_{0.3}(OH)_2(CO_3{}^{2-})_{0.15} \cdot 0.55H_2O$, an average particle diameter of 0.3 micron and a BET specific surface area of 12 m²/g was dried at 250° C. for about 2 hours to remove water of crystallization nearly completely. Immediately then, it was transferred to a Henschel mixer, and 30 g of molten lauric acid was added with stirring. They were fully mixed for about 20 minutes.

The resulting surface-treated hydrotalcite (3 parts by weight) was fully mixed with the following ingredients.

| Polyvinyl chloride | 100 parts by weight |
|---|---|
| DOP | 40 parts by weight |
| Pentaerythritol | 1 parts by weight |
| Zinc stearate | 0.5 parts by weight |
| Epoxy-type plasticizer | 2 parts by weight |
| Hydrotalcite | 3 parts by weight |

They were further melt-kneaded and formed into a film having a thickness of 50 microns by a melt extrusion molding method. The visible light and infrared radiation transmittances and heat insulating property of this film were measured as in Example 1. The results are summarized in Table 2.

CONTROL EXAMPLE 2

A control film was prepared in the same way as in Example 5 except that the addition of the hydrotalcite was omitted. The visible light and infrared radiation transmittances and heat insulating effect of the resulting film were measured as in Example 5. The results are summarized in Table 2.

What is claimed is:

1. In a method for growing cultivated plants which comprises covering the locus where the cultivated plants are grown or are to be grown with an agricultural film structure, the improvement comprising the step of covering said locus with a film structure comprised of a mixture of
   (a) 100 parts by weight of a thermoplastic resin and
   (b) about 1 to about 20 parts by weight of a hydrotalcite powder, as an infrared radiation absorbing powdery inorganic compound, having an average secondary particle diameter of not more than about 5 microns and a BET specific surface area of not more than about 30 m²/g and being represented by the following formula (1)

$$M_{1-x}^2 Al_x(OH)_2(A^{n-})_{x/n} \cdot mH_2O \qquad (1)$$

wherein $M^{2+}$ represents a divalent metal ion selected from the group consisting of Mg, Ca and Zn ions, $A^{n-}$ represents an anion having a valence of n, and x and m satisfy the following conditions $0 < x < 0.5$
$0 \leq m \leq 2$, thereby improving visible light availability and heat retention for said cultivated plants.

2. The method of claim 1 wherein the thermoplastic resin is selected from the group consisting of olefin resins, vinyl chloride resin, and blends of these resins.

3. The method of claim 1 wherein the hydrotalcite powder of formula (1) is surface-treated with a surface-treating agent selected from the group consisting of higher fatty acids, alkali metal salts of higher fatty acids and coupling agents.

4. The method of claim 1 wherein the film structure has a thickness of about 10 to about 200 microns.

* * * * *

TABLE 2

| Example | Inorganic infrared radiation absorbing agent Type | Average secondary particle diameter (microns) | BET specific surface area (m²/g) | Amount per 100 parts by weight of resin | Visible light (0.4–0.7 micron) transmittance (%) | Infrared (5–50 micron) transmittance (%) | Heat insulating effect (the lowest temperature, °C., inside the tunnel under the lowest outside temperature was −2.1° C.) |
|---|---|---|---|---|---|---|---|
| Example 5 | $Mg_{0.7}Al_{0.3}(OH)_2(CO_3{}^{2-})_{0.15} \cdot 0.55 H_2O$ | 0.3 | 12 | 3 | 89 | 6 | 5.9 |
| Control Example 2 | — | — | — | — | 91 | 35 | 3.7 |